United States Patent
Kim et al.

(10) Patent No.: US 8,054,851 B2
(45) Date of Patent: Nov. 8, 2011

(54) METHOD FOR DETECTING HIDDEN STATION IN A WIRELESS COMMUNICATION NETWORK AND SYSTEM THEREFOR

(75) Inventors: Youngsoo Kim, Seoul (KR); Sunghyun Choi, Seoul (KR); Jong-Ae Park, Yongin-si (KR); Dong-Jun Lee, Seoul (KR); Jung-Hoon Suh, Yongin-si (KR); Hyo-Sun Hwang, Seoul (KR); Kyung-Hun Jang, Suwon-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 608 days.

(21) Appl. No.: 11/653,605

(22) Filed: Jan. 16, 2007

(65) Prior Publication Data
US 2007/0183445 A1 Aug. 9, 2007

Related U.S. Application Data

(60) Provisional application No. 60/759,247, filed on Jan. 13, 2006.

(30) Foreign Application Priority Data

Jun. 5, 2006 (KR) .................. 10-2006-0050534

(51) Int. Cl.
*H04L 12/413* (2006.01)

(52) U.S. Cl. ........ 370/445; 370/230; 370/277; 370/278; 370/328; 370/329; 455/500; 709/237

(58) Field of Classification Search .................. 370/349, 370/312, 328, 338, 343, 344
See application file for complete search history.

(56) References Cited

U.S. PATENT DOCUMENTS

| 7,130,289 B2 * | 10/2006 | Kuan et al. ..................... 370/338 |
| 7,184,407 B1 * | 2/2007 | Myles et al. ................... 370/242 |
| 2005/0169232 A1 * | 8/2005 | Sakoda et al. ................ 370/347 |
| 2006/0056421 A1 * | 3/2006 | Zaki .............................. 370/400 |
| 2007/0002804 A1 * | 1/2007 | Xiong et al. ................... 370/335 |

FOREIGN PATENT DOCUMENTS

| WO | WO 03/079708 | 9/2003 |
| WO | WO 2004/028062 | 4/2004 |
| WO | WO 2004028062 A1 * | 4/2004 |

OTHER PUBLICATIONS

Pablo Brenner, "A Technical Tutorial on the IEEE 802.11 Protocol", 1997, BreezeCOM Wireless Communications pp. 16-22.*

* cited by examiner

*Primary Examiner* — Rafael Pérez-Gutiérrez
*Assistant Examiner* — Neda Behrooz
(74) *Attorney, Agent, or Firm* — NSIP Law

(57) ABSTRACT

Disclosed is a method for detecting a hidden station in a specific station constituting a wireless communication network that includes receiving a frame after a lapse of an idle state interval longer than a predetermined waiting time; determining that there is a hidden station, if a size of the received frame is equal to a size of an Acknowledge (ACK) frame; and determining that there is no hidden station, if the size of the received frame is not equal to the size of the ACK frame.

9 Claims, 9 Drawing Sheets

METHOD FOR DETECTING HIDDEN STATION IN A WIRELESS COMMUNICATION NETWORK AND SYSTEM THEREFOR

CROSS-REFERENCE TO RELATED APPLICATIONS

This application claims the benefit under 35 U.S.C. §119 (a) to Provisional Patent Application filed in the United States Patent and Trademark Office on Jan. 13, 2006, and assigned Ser. No. 60/759,247, as well as to Patent Application filed in the Korean Intellectual Property Office on Jun. 5, 2006, and assigned Serial No. 2006-50534, the entire disclosure of each of which is incorporated herein by reference.

BACKGROUND OF THE INVENTION

1. Field of the Invention

The present invention relates generally to a wireless communication network, and, in particular, to a method and system for detecting a hidden station in a wireless communication network.

2. Description of the Related Art

Of the standards for wireless communication networks, the Institute of Electrical and Electronics Engineers (IEEE) 802.11 family of standards defines a hidden station. Assuming that a first station and a second station are performing communication with each other, and a third station, which is an arbitrary station, is observing the communication, the third station receives Medium Access Control (MAC) Protocol Data Units (PDUs) from the second station. The PDUs have a MAC address of the second station as a Transmitter Address (TA), and have a MAC address of the first station as a Receiver Address (RA). In addition, the third station receives PDUs from the first station. The PDUs have a MAC address of the first station as a TA, and has a MAC address of the second station as an RA.

However, it is possible that the third station has received a PDU from the second station but has failed to receive a PDU from the first station. In this situation, the third station can perceive the presence of the first station. In this situation, the first station is a hidden station for the third station.

Commonly, if a MAC frame including a MAC address is generated in a MAC layer, the MAC frame is transferred to a physical (PHY) layer, which is a lower layer, for transmission. In the PHY layer, a PHY PDU (PPDU), which is a basic PHY frame including the MAC frame, is generated and then transmitted through wireless resources. For purposes of providing a description herein, a format of the basic frame specified in the IEEE 802.11a standard will be utilized as an example of the structure of the basic PHY frame.

FIG. 1 is a diagram illustrating a structure of a basic PHY frame. Referring to FIG. 1, a Physical Layer Convergence Procedure (PLCP) preamble is comprised of a predetermined number of OFDM symbols, and is used in a receiver for detection of a received frame.

A PLCP Header corresponding to a Signal field includes a 4-bit Rate field, a 1-bit Reserved field, a 12-bit Length field, a 1-bit Parity field, a 6-bit Tail field, and a 16-bit Service field, and is modulated by Binary Phase Shifting Keying (BPSK) and comprised of one OFDM symbol encoded with a ½-rate convolutional code. Herein, the fields containing information important to the present invention include the Rate field indicating a data rate at which a PHY Service Data Unit (PSDU) including a MAC frame is transmitted, and the Length field of the MAC frame or the PDSU. The basic frame structure follows the standard, and a description of the fields other than the foregoing fields is known to those of skill in the art.

Meanwhile, a range where a frame can be transmitted is determined according to a frame data rate. A frame transmitted at a lower data rate can be transferred farther. Because the PLCP Header is generally transmitted at a lower data rate compared with the data or the PDSU, a range (header transfer range) where the PLCP Header can be transferred is greater than a range (data transfer range) where the data can be transferred.

Therefore, a description of hidden station detection according to the definition given in the standard can be given as follows, based on an assumption that a first station receives and decodes not only the PLCP Header but also the whole data frame. After the decoding, the first station recognizes from the decoded data frame that an RA of the frame is indicated as a hardware address, i.e. MAC address, of a second station. However, if the first station has never received a data frame having a MAC address of the second station as a TA, the first station regards the second station as a hidden station.

However, the first station can perceive use/nonuse of a corresponding wireless medium even with the use of the Rate field and the Length field included in the PLCP Header in order to detect a hidden station. That is, the first station has no need to detect a MAC address of a transmitter or a receiver, which it can obtain by receiving and decoding a data frame that cannot be transferred far as it is transmitted at a high data rate. Therefore, there is a need to newly define a hidden station and to efficiently detect the presence/absence of the hidden station.

SUMMARY OF THE INVENTION

An aspect of the present invention is to address at least the problems and/or disadvantages and to provide at least the advantages described below. Accordingly, an aspect of the present invention is to provide a method and system for detecting presence/absence of a hidden node in a wireless communication network.

Another aspect of the present invention is to provide a method and system for improving system throughput performance by applying an RTS/CTS mechanism only in the presence of a hidden node in a wireless communication network.

A further aspect of the present invention is to provide a method and system for efficiently transmitting/receiving data in a wireless communication network.

According to an aspect of the present invention, there is provided a method for detecting a hidden station in a specific station constituting a wireless communication network. The hidden station detection method includes receiving a frame after a lapse of an idle state interval longer than a predetermined waiting time; determining that there is a hidden station, if a size of the received frame is equal to a size of an Acknowledge (ACK) frame; and determining that there is no hidden station, if the size of the received frame is not equal to the size of the ACK frame.

According to another aspect of the present invention, there is provided a method for detecting a hidden station in a specific station among a plurality of stations in a wireless communication network including the plurality of stations. The hidden station detection method includes if a second station is located in a data transfer range where both data and a physical layer header transmitted by a first station can be received, determining that the second station is not a hidden station of the first station; if a third station is located in a physical layer header transfer range where data transmitted by the first station cannot be received but a physical layer header transmitted by the first station can be received, determining that the third station is not a hidden station of the first station; and if a fourth station is located out of a physical layer header transfer range where data and a physical layer header transmitted by the first station cannot be received, and is located in a range where an Acknowledge (ACK) frame for the data transmitted by the first station can be received, determining that the fourth station is a hidden station of the first station.

According to yet another aspect of the present invention, there is provided a system for detecting a hidden station in a wireless communication network. The system includes a transmitting station for transmitting a data frame; a receiving station for receiving the transmitted data frame, and transmitting an Acknowledge (ACK) frame responsive to the data frame; and a specific station; wherein the specific station receives a frame after a lapse of an idle state interval longer than a predetermined waiting time, determines that the specific station itself is a hidden station for the transmitting station if a size of the received frame is equal to a size of the ACK frame, and determines that the specific station itself is not a hidden station for the transmitting station if the size of the received frame is not equal to the size of the ACK frame.

According to still another aspect of the present invention, there is provided a method for detecting a hidden station in a specific station constituting a wireless communication network. The hidden station detection method includes receiving a frame after a lapse of an idle state interval longer than a predetermined waiting time; and determining that there is a hidden station, if the received frame is an Acknowledge (ACK) frame including a Medium Access Control (MAC) header.

BRIEF DESCRIPTION OF THE DRAWINGS

The above and other aspects and features of the present invention will become more apparent from the following detailed description when taken in conjunction with the accompanying drawings in which.

DETAILED DESCRIPTION OF EMBODIMENTS

Figure 1:
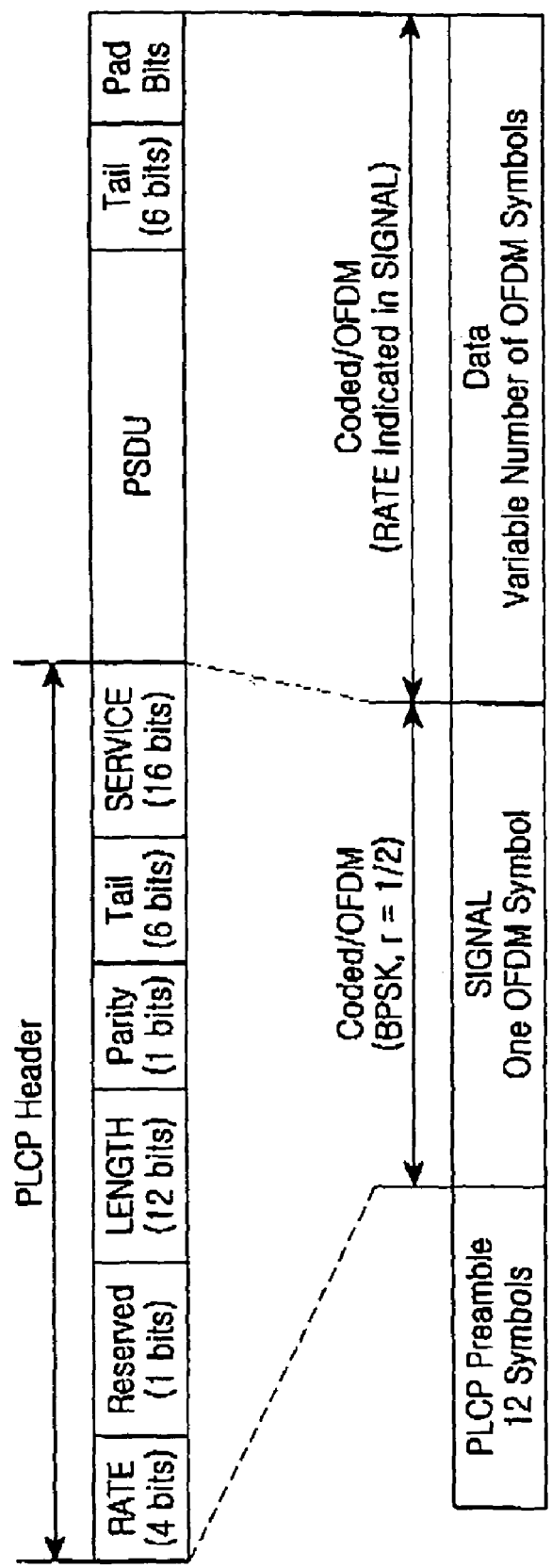
FIG. 1 is a diagram illustrating a structure of a basic PHY frame.

Aspects of the present invention will now be described in detail with reference to the annexed drawings, which utilize the same reference numerals to refer to similar elements, features and structures. In the following description, a detailed description of known functions and configurations incorporated herein has been omitted for clarity and conciseness.

In a wireless communication network, data is transmitted using shared wireless resources. A node (hereinafter also called "station") having transmission data transmits the data using the wireless resources unused by other nodes, among the available wireless resources. However, because the wireless resources are shared by several nodes in the network, more than two nodes may simultaneously transmit data using the same wireless resources. In this case, collision may occur between transmission data, causing damage to the transmission data. Therefore, in order to prevent collision, communication in the wireless network uses Media Access Control (MAC) protocol as a mechanism for controlling use of the wireless resources.

A scheme in which use of the wireless resources is controlled by the MAC protocol is classified into a scheme in which an Access Point (AP) controls use of wireless resources of a station (STA) so as to allocate available wireless resources to a station that desires to transmit data, and a scheme in which each of a plurality of stations spontaneously checks available wireless resources and transmits data using the checked available wireless resources. A description is provided below of a method for transmitting data using wireless resources according particularly to the latter scheme.

Figure 2:
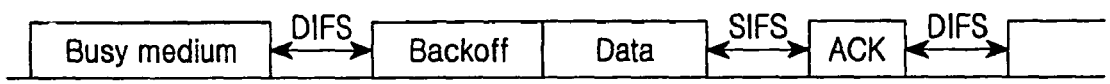
FIG. 2 is a diagram illustrating a process of transmitting/receiving data using a MAC protocol.

FIG. 2 illustrates a process of transmitting/receiving data using a MAC protocol. If a station desires to transmit data to another station, the station that desires to transmit the data determines through carrier sensing whether there is any medium in an idle station for the data transmission. In the following description, wireless resource and wireless medium are interchangeably used.

Referring to FIG. 2, if the station that desires to transmit data senses, through carrier sensing, presence of a medium that has transitioned from a busy state to an idle state, the station will wait for a predetermined time. The waiting time is called Distributed Coordinated Function (DCF) Inter Frame Space (DIFS), which means a time for which the station should wait after a DCF operation for transmitting data. If the medium is still in the idle state even after the station has waited for the DIFS, the station can send data through the medium.

However, if there are more than two stations which are waiting in the DIFS interval, the more than two stations can simultaneously transmit data using the medium in the idle state after a lapse of the DIFS interval. In order to prevent data collision and damage due to the simultaneously data transmission, a MAC layer allows the stations to select a random backoff counter after the DIFS and start a backoff process. The backoff counter is found by adding a random value to a slot time value. While the medium remains in the idle state, the backoff counter decreases every slot time period, and when the backoff counter is zero, the stations transmit data for the first time.

After the backoff process, if the data successfully arrives at a receiving station, the receiving station waits a Shorter Inter Frame Space (SIFS) which is a short waiting time, and then transmits an Acknowledge (ACK) indicating successful receipt of the data to the transmitting station. Generally, through this process, MAC protocol-based data transmission is performed.

As described above, a range (data transfer range) where data can be transmitted is determined according to data transmission power and data rate of a transmitting side that transmits data. Commonly, an increase in the transmission power increases the data rate, but the increase in the data rate reduces the range where the data can be transmitted. Therefore, once the data rate for data transmission is determined, the data can be transmitted and received within a specific range. In the specific range, stations can perform carrier sensing. Carrier sensing refers to sensing whether a particular carrier, i.e. a wireless medium for data transmission, is now transmitting data or is in an idle state.

Because the range where data can be transmitted and received is limited in this way, even though an out-range station located out of the range where a particular station can exchange data with the out-range station is communicating with another station using wireless resources, the particular station can take the wireless resources used for the communication as resources in the idle state. A problem caused by impossibility of carrier sensing for communication of the out-range stations located out of the range where communication is possible, referred to as a hidden node (or station) problem, and a station located in the range where the carrier sensing is impossible is called a hidden node. The hidden node considerably reduces network performance. Accordingly, one of the schemes disclosed to solve the hidden node problem is a Request-to-Send (RTS)/Clear-to-Send (CTS) mechanism.

Figure 3:
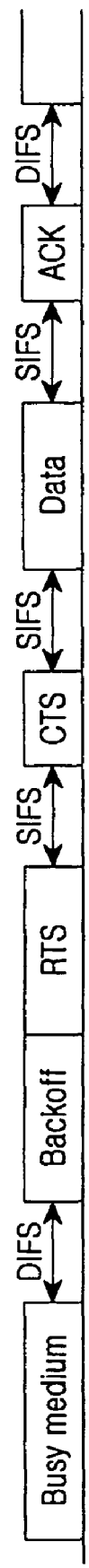
FIG. 3 is a diagram illustrating a process of transmitting/receiving data using an RTS/CTS mechanism.

FIG. 3 illustrates a process of transmitting/receiving data using an RTS/CTS mechanism. Referring to FIG. 3, a transmitting station that desires to transmit data waits a DIFS and performs a backoff process. Thereafter, the transmitting station transmits an RTS frame to an Access Point (AP), rather than directly transmitting the data as described in FIG. 2. The RTS frame, which is a short frame, can include length information for transmission data and information for identifying the transmitting station, and aims at an approve request for use of a valid medium. The transmitting station can be a terminal, and the AP can be a base station. Although data exchange between a terminal and a base station are described herein by way of example, the base station can also serve as a station and it is possible for the data exchange between the stations.

An AP receiving an RTS frame from the transmitting station transmits, after waiting an SIFS, a CTS frame to all stations located in its range in response to the RTS frame. The CTS frame, which is an ACK for the RTS frame, aims at a notification for a use approval of a valid medium to the transmitting station that requested the use of the medium. In addition, because the CTS frame can include data transmission time and/or data length information allocated to the transmitting station, other stations receiving the CTS frame from the AP can also acquire the information indicating how long the medium can be used by what station. By exchanging the RTS/CTS frames in this way, it is possible to prevent the problem which may be caused by the use of the same medium with a carrier sensing-failed hidden node.

The RTS/CTS mechanism is advantageous in the presence of the hidden node, but the exchange of the RTS/CTS frames causes an increase in energy consumption and a waste of the bandwidth.

Figure 4:
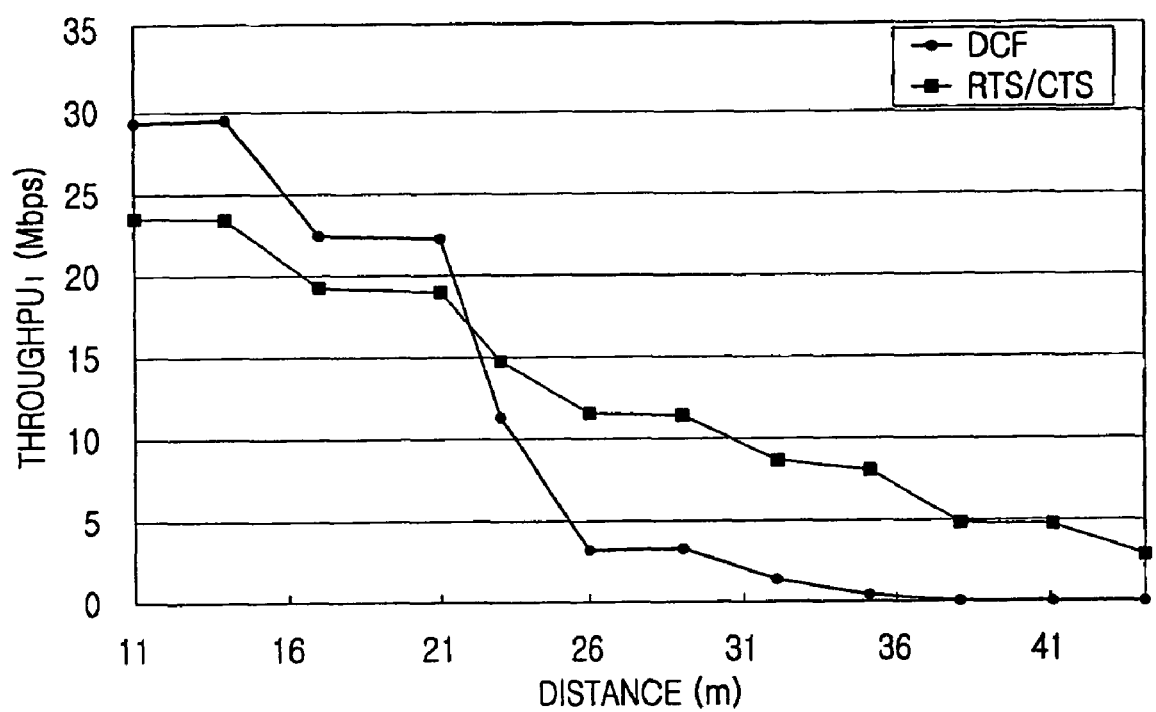
FIG. 4 is a distance-throughput characteristic graph illustrating a performance comparison between DCF and RTS/CTS operation modes, obtained through simulation.

FIG. 4 is a distance-throughput characteristic graph illustrating a performance comparison between DCF and RTS/CTS operation modes, obtained through simulation. For simulation conditions, it is assumed that an AP is located in the center of the network, that eight stations are uniformly located in the cell boundary, and that all stations transmit a 1500-byte frame to the AP. The system throughput performance is measured while varying the cell radius (or distance) from 11 m to 45 m. In this simulation, it is assumed that data is transmitted at an ideal data rate and channel errors are not considered.

Referring to FIG. 4, when frames are transmitted and received in the DCF operation mode, the shorter distance shows the higher system throughput performance. However, an increase in the distance causes an abrupt reduction in the throughput performance, for the following reason. That is, as the distance increases, there is higher possibility that stations will serve as hidden stations with respect each other. If a hidden station exists, it is possible for transmitting of data without recognizing use/nonuse of a medium for the hidden station, and retransmitting the data if the data is damaged during its transmission. In FIG. 4, if the distance exceeds 21 m, the number of hidden stations can increase, causing an abrupt reduction in the throughput performance.

To the contrary, when the RTS/CTS mechanism is used, the shorter distance shows the lower system throughput performance, compared with use of the DCF operation mode. Where the distance is short enough so that the stations do not serve as hidden stations with respect to each other, the use of the RTS/CTS mechanism reduces the throughput performance. However, the longer distance shows the higher system throughput performance, compared with use of the DCF mode, for the following reason. That is, when the stations serve as hidden stations with respect to each other, more than two stations may simultaneously transmit data, causing data collision. Nevertheless, because the RTS/CTS mechanism transmits an RTS frame before transmitting data, the RTS frame, which is a shorter frame, is damaged. After the exchange of the RTS/CTS frames, a station using the RTS/CTS mechanism transmits data after determining that the medium can be used by the station itself, thus reducing the data damage possibility due to the collision. As a result, the throughput performance is higher than that in the DCF mode. In FIG. 4, for better throughput performance, it is preferable to use the RTS/CTS mechanism from the distance=21 m, where the number of hidden stations may abruptly increase.

Therefore, nonuse of the RTS/CTS mechanism is advantageous in the absence of the hidden node, and use of the RTS/CTS mechanism is advantageous in the presence of the hidden node. That is, it is important to determine whether to use the RTS/CTS mechanism by accurately detecting presence/absence of the hidden node. Therefore, the present invention discloses a method and apparatus for accurately detecting a hidden node, or a hidden station. As a result of the detection, the present invention uses the RTS/CTS mechanism in the network having a hidden node(s) and does not use the RTS/CTS mechanism in the network having no hidden node.

A description is provided below of the hidden station of the present invention, which can detect a hidden station using a PLCP header of data, which can be received in a range broader than a data transfer range, without necessarily using a MAC address as defined in the existing standard. Because a determination of use/nonuse of the wireless medium can be made by simply analyzing the received PLCP header, a determination can be made of presence/absence of the hidden station in the network. In the present invention, the station detected using the foregoing method is defined as a hidden station, and a detailed description is provided herein.

Figure 5:
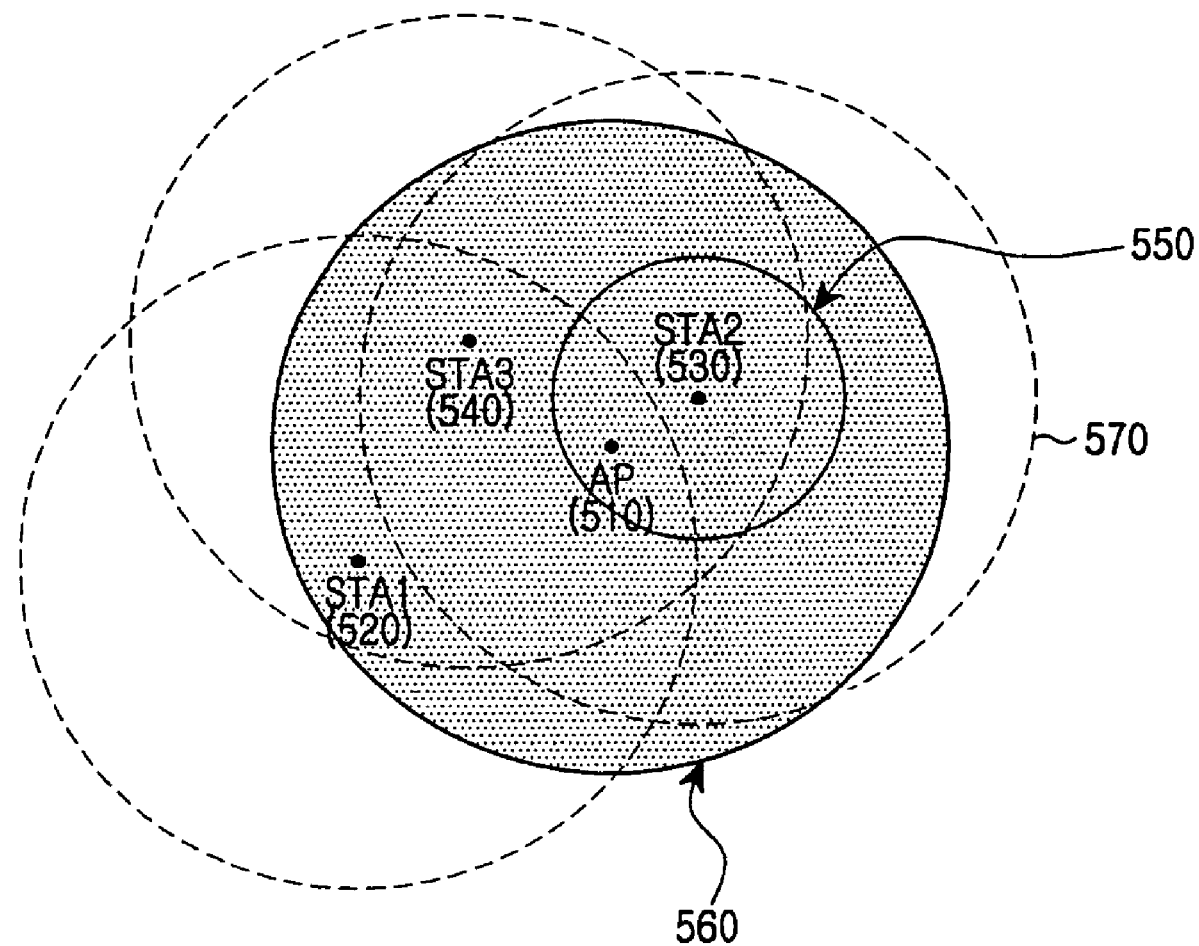
FIG. 5 schematically illustrates a PLCP header transfer range and a data transfer range for each individual station according to the present invention.

FIG. 5 schematically illustrates a PLCP header transfer range and a data transfer range for each individual station according to the present invention. In FIG. 5, the description utilizes an AP 510 and an STA #2 530. Referring to FIG. 5, the AP 510 is a base station that communicates with STAs, and can exchange data with an STA #1 520 through an STA #3 540.

Each large circle shown in FIG. 5 corresponds to a range where a PLCP header transmitted from the AP 510 or the STAs 520, 530 and 540, which are located in the centers of their respective circles, can be transferred. A small circle corresponds to the range where data transmitted from the STA #2 530 located in its center can be transferred.

In other words, an AP header transfer range 560 indicates a range where a PLCP header can be transmitted from the AP 510. An STA #2 data transfer range 550 indicates a range where data transmitted from the STA #2 530 can be received, and an STA #2 header transfer range 570 indicates a range where a PLCP header of the data transmitted by the STA #2 530 can be received. Because the PLCP header, compared with the data, is transmitted at a lower data rate, the header transfer range 570 is broader than the data transfer range 550.

The STA #3 540 is located outside of the STA #2 data transfer range 550 where it can the receive data that STA #2 530 transmits to the AP 510, but is located within the header transfer range 570 of the STA #2 530. Therefore, the STA #3 540 can receive a PLCP header from the STA #2 530, and can also acquire information on the medium that the STA #2 530 uses while transmitting data. In this manner, it is possible to prevent reuse of the wireless medium currently in use. Therefore, the STA #3 540 is not a hidden station for the STA #2 530.

However, the STA #3 540 cannot receive data from the STA #2 530, because it is located outside of the data transfer range 550 of the STA #2 530. Therefore, the STA #3 540, as it cannot obtain a MAC address from decoded data, cannot determine which station is a hidden station.

More specifically, the STA #1 520 is located within the header transfer range 560 of the AP 510, but is located outside of the data transfer range 550 and the header transfer range 570 of the STA #2 530. Therefore, because the STA #2 530 cannot receive information on the data transmitted by the STA #1 520, the STA #1 520 is a hidden station for the STA #2 530. However, with the use of the existing scheme that determines a hidden station using a MAC address, it is not possible to determine that the STA #1 520 is a hidden station of the STA #2 530.

In the present invention, a first station is located in the range where it cannot receive data and PLCP header transmitted from a second station, and is located in the range where it can receive an ACK frame for the data transmitted by the second station. In this case, the first station determines that the second station as a hidden station. That is, the present invention does not determine the station located in a PLCP header transfer range where it can detect use/nonuse of a wireless medium, as a hidden station without the need for detecting the PLCP header and data.

Figure 6:
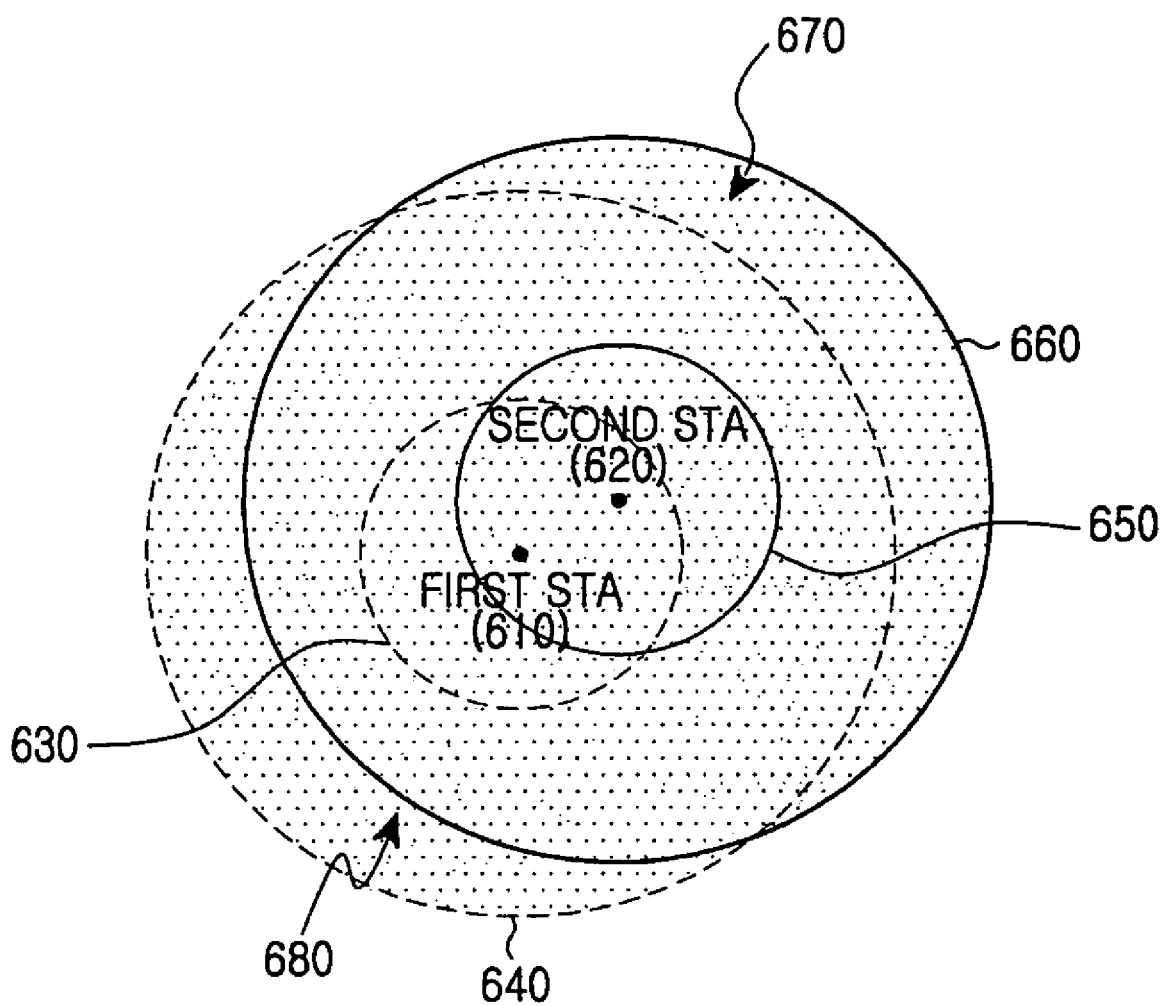
FIG. 6 schematically illustrates a hidden range and a non-hidden range distinguished according to the present invention.

FIG. 6 schematically illustrates a hidden range (or hidden area) and a non-hidden range (or non-hidden area) distinguished according to the present invention. It is assumed in FIG. 6 that two stations are exchanging data with each other.

Referring to FIG. 6, a first STA 610 transmits a data frame to a second STA 620, and transmits an ACK frame in response to a data frame received from the second STA 620. The second STA 620 transmits a data frame to the first STA 610, and transmits an ACK frame in response to a data frame received from the first STA 610. With reference to the first STA 610 and the second STA 620, the hidden station of the present invention will be described.

A first data frame receivable range 630 indicates a range where a data frame transmitted by the first STA 610 can be received. Two STAs (not shown) located in the first data frame receivable range 630 can normally receive the data frame transmitted by the first STA 610. The phrase normally receiving the data frame means the possibility of normally receiving a PLCP header of the data frame.

A first PLCP header receivable range 640 indicates a range where a data frame transmitted by the first STA 610 cannot be received but where a PLCP header of the data frame can be received. Therefore, STAs (not shown) located within the first PLCP header receivable range 640 can detect data frame transmission by the first STA 610. Thus, the first PLCP header receivable range 640 where the data frame transmission from the first STA 610 can be detected is called a non-hidden range from the viewpoint of the first STA 610.

A second data frame receivable range 650 indicates a range where a data frame transmitted by the second STA 620 can be received. STAs (not shown) located within the second data frame receivable range 650 can normally receive the data frame transmitted by the second STA 620. The phrase normally receiving the data frame is similarly used for the second data frame receivable range.

A second PLCP header receivable range 660 indicates a range where a data frame transmitted by the second STA 620 cannot be received but a PLCP header of the data frame can be received. Therefore, STAs (not shown) located in the second PLCP header receivable range 660 can detect the data frame transmission by the second STA 620. Thus, the second PLCP header receivable range 660 where the data frame transmission from the second STA 620 can be detected is similarly called a non-hidden range from the viewpoint of the second STA 620.

A first hidden range 670 corresponds to the remaining range obtained by excluding the first PLCP header receivable range 640 from the second PLCP header receivable range 660. An STA located in the first hidden range 670 cannot perform carrier sensing, because it is unable to receive either the data frame or the PLCP header transmitted by the first STA 610, though it can receive an ACK frame transmitted from the second STA 620. Therefore, the STA located in the first hidden range 670 is detected as a hidden station for the first STA 610.

A second hidden range 680 corresponds to the remaining range obtained by excluding the second PLCP header receivable range 660 from the first PLCP header receivable range 640. An STA located in the second hidden range 680 cannot perform carrier sensing, because it is unable to receive either the data frame or the PLCP header transmitted by the second STA 620, though it can receive an ACK frame transmitted from the first STA 610. Therefore, the STA located in the second hidden range 680 is detected as a hidden station for the second STA 620.

As described above, the hidden station can be detected depending whether it is in a carrier sensing range. If it is possible to recognize, through an ACK frame transmitted by the second STA 620, the presence of an STA located outside of the carrier sensing range where the data frame and the PLCP header transmitted by the first STA 610 can be received, the STA located out of the carrier sensing range can be determined as a hidden station for the first STA 610. To the contrary, if it is possible to recognize, through ACK frame transmitted by the first STA 610, the presence of an STA located outside of the carrier sensing range where the frame data and the PLCP header transmitted by the second STA 620 can be received, the STA located outside of the carrier sensing range can be determined as a hidden station for the second STA 620.

Figure 7A:
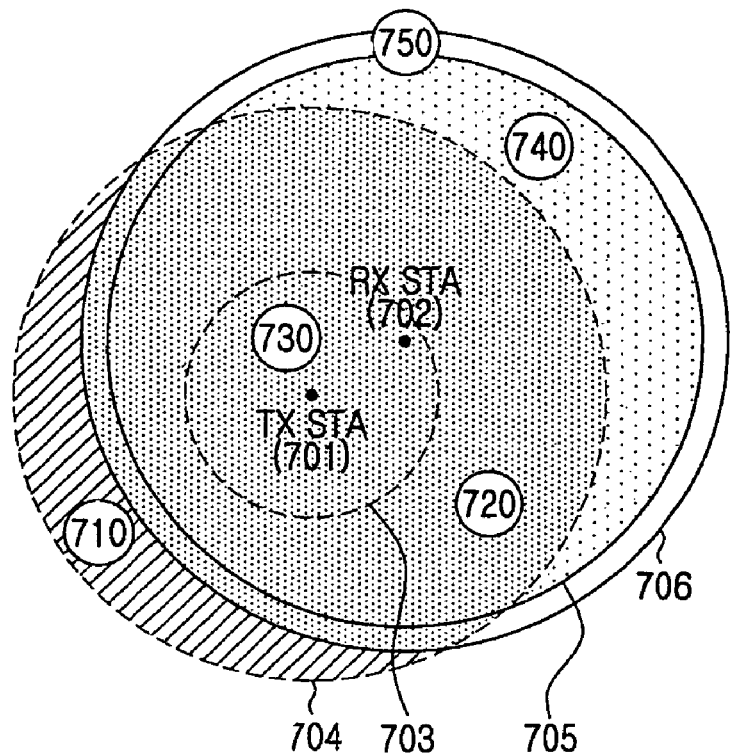
FIGS. 7A and 7B provide examples of determining a hidden station in a wireless communication network according to the present invention.
Figure 7B:
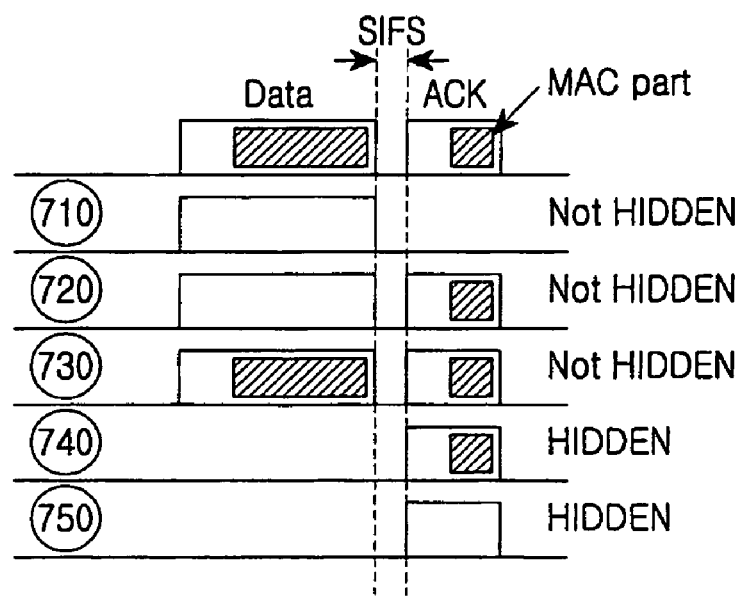

With reference to FIGS. 7A and 7B, a detailed description is provided of receipt/non-receipt of data, PLCP header and ACK for each range, and determination of a hidden station according thereto. FIGS. 7A and 7B provide examples of determining a hidden station in a wireless communication network according to the present invention. It is assumed in FIGS. 7A and 7B that there are one transmitting STA (TX STA) and one receiving STA (RX STA), denoted by the same reference numeral.

Referring to FIG. 7A, a TX STA 701, which is a transmitting terminal, transmits a data frame. The data frame includes a PLCP header and a data part. An RX STA 702 is a receiving terminal. The RX STA 702 receives a data frame transmitted from the TX STA 701, and transmits an ACK frame in response to receipt of the data frame. The ACK frame includes a MAC part.

A data frame receivable range 703 indicates a range where the data frame transmitted from the TX STA 701 can be normally received. Therefore, a terminal located within the data frame receivable range 703 can transmit the data frame transmitted from the TX STA 701. The RX STA 702 is one of the terminals located in the data frame receivable range 703.

A PLCP header receivable range 704 indicates a range where a data part in the data frame transmitted from the TX STA 701 cannot be received but a PLCP header in the data frame can be normally received. Therefore, a terminal located within the PLCP header receivable range 704 can receive a PLCP header constituting the data frame transmitted from the TX STA 701.

An ACK frame receivable range 705 indicates a range where an ACK frame transmitted from the RX STA 702 can be normally received. Therefore, a terminal located in the ACK frame receivable range 705 can received an ACK frame transmitted from the RX STA 702.

An ACK frame recognizable range 706 indicates a range where the ACK frame transmitted from the RX STA 702 can be received, but an MAC part constituting the ACK frame cannot be normally received. Therefore, a terminal located in the ACK frame recognizable range 706 cannot acquire information written in the MAC part, even though it receives the ACK frame transmitted from the RX STA 702. The information written in the MAC part can include information on a transmitter address, a data type, and the like.

The ranges formed by the TX STA 701 and the RX STA 702 can be subdivided according to receipt/non-receipt of data frame and ACK frame. That is, the ranges can be subdivided into first through fifth ranges 710, 720, 730, 740 and 750.

The first range 710 indicates a range that is included only in the PLCP header receivable range 704, and not included in the other ranges 703, 705 and 706. A terminal located within the first range 710 can receive only the PLCP header of the data frame transmitted from the TX STA 701, but cannot receive a data part of the data frame and the ACK frame transmitted from the RX STA 702. Therefore, the terminal located within the first range 710 is not a hidden terminal for the TX STA 701.

The second range 720 is a range that is included only in the PLCP header receivable range 704 and the ACK frame receivable range 705, and not included in the other ranges 703 and 706. A terminal located within the second range 720 can receive a PLCP header of the data frame transmitted from the TX STA 701 and the ACK frame transmitted from the RX STA 702, and cannot receive a data part of the data frame. Therefore, the terminal located in the second range 720 is not a hidden terminal for the TX STA 701.

The third range 730 is a range that is included in all ranges formed by the TX STA 701 and the RX STA 702. A terminal located within the third range 730 can normally receive not only the data frame transmitted from the TX STA 701, but also the ACK frame transmitted from the RX STA 702. Therefore, the terminal located in the third range 730 is not a hidden terminal for the TX STA 701.

The fourth range 740 is a range that is included only in the ACK frame receivable range 705, and not included in the other ranges 703, 704 and 706. A terminal located within the fourth range 740 can normally receive only the ACK frame transmitted from the RX STA 702, but cannot receive the data frame transmitted from the TX STA 701. Therefore, the terminal located in the fourth range 740 is a hidden terminal for the TX STA 701.

The fifth range 750 is a range that is included only in the ACK frame recognizable range 706, and not included in the other ranges 703, 704 and 705. A terminal located within the fifth range 750 can receive only the ACK frame transmitted from the RX STA 702, but cannot acquire the data frame transmitted from the TX STA 701 and information written in a MAC part of the ACK frame. Therefore, the terminal located in the fifth range 750 is a hidden terminal for the TX STA 701.

In the foregoing description, a sixth range included in the PLCP header receivable range 704 and the ACK frame recognizable range 706 is not defined. However, a terminal located in the sixth range is not a hidden terminal for the TX STA 701, because it can receive a PLCP header of the data frame transmitted from the TX STA 701.

Referring to FIG. 7B, in the first range 710, a PLCP header in the data frame transmitted by a TX STA 701 can be received. Therefore, it can be detected that an STA located in the first range 710 is not a hidden station for the TX STA 701.

In the second range 720, not only the PLCP header in the data frame transmitted by the TX STA 701 can be received, but also the ACK frame transmitted by the RX STA 702 can be normally received. Therefore, it can be detected that an STA located in the second range 720 is a not hidden station for the TX STA 701.

In the third range 730, not only the data frame transmitted by the TX STA 701 but also the ACK frame transmitted by the RX STA 702 can be normally received. Therefore, it can be detected that an STA located in the third range 730 is not a hidden station for the TX STA 701.

In the fourth range 740, the data frame transmitted by the TX STA 701 cannot be received, but the ACK frame transmitted by the RX STA 702 can be normally received. Therefore, it can be detected that an STA located in the fourth range 740 is a hidden station for the TX STA 701.

In the fifth range 750, the data frame transmitted by the TX STA 701 cannot be received, but transmission of an ACK frame by the RX STA 702 can be recognized. Therefore, it can be detected that an STA located in the fifth range 750 is a hidden station for the TX STA 701.

Figure 8:
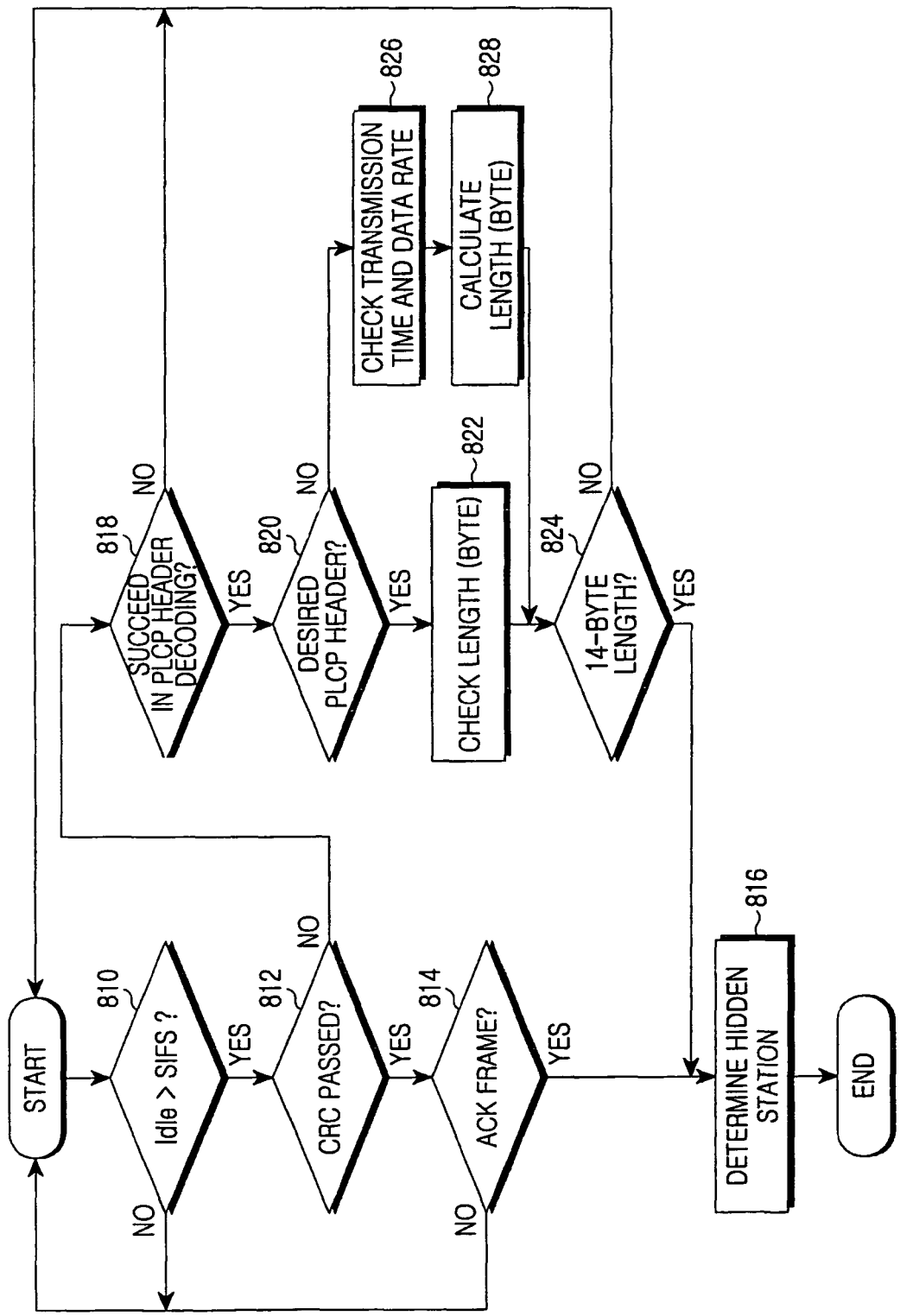
FIG. 8 is a flowchart illustrating a process of detecting a hidden station according to the present invention.

FIG. 8 illustrates a control flow for detecting a hidden station according to the present invention. Referring to FIG. 8, upon receipt of a frame, an STA compares an idle state interval with a predetermined waiting time in step 810. For example, the waiting interval can be set as an SIFS. The idle state interval means an interval where there is no frame that the STA can receive. That is, the idle state interval can be defined by an interval between two consecutively received frames. In the following description, the state where no data is received is defined as an idle state, and the state where data is received is defined as a busy state.

The STA determines that there is no hidden station, before a lapse of a predetermined waiting time, i.e. if the idle state interval is less than or equal to the predetermined waiting time. This determination is possible for the ranges 720 and 730 of FIGS. 7A and 7B. That is, if an interval between an $n^{th}$ received frame and an $(n+1)^{th}$ received frame satisfies the SIFS, this corresponds to the ranges 720 and 730 of FIGS. 7A and 7B, so the STA can determine that there is no hidden station.

However, if the predetermined waiting time has elapsed, i.e. if the idle state interval is greater than the predetermined waiting time, the STA determines that there is a need for an operation of determining a hidden station. This determination is possible for the ranges 710, 740 and 750 of FIGS. 7A and 7B. That is, because this corresponds to the state where the STA has received an $(n+1)^{th}$ frame with failure to receive an $n^{th}$ frame, it can be determined that the situation corresponds to the ranges 710, 740 and 750 of FIGS. 7A and 7B. Therefore, in the following description, once the situation corresponding to the range 710 is detected, the STA can accurately detect the situation where there is a hidden station. To this end, the STA proceeds to step 812, if the idle state interval is greater than the predetermined waiting time.

In step 812, the STA performs Cyclic Redundancy Check (CRC) on the received frame, and determines whether a normal frame has been transmitted. If the CRC is successfully completed, it can be considered that a normal ACK frame or a normal data frame has been received. However, if the CRC is not successfully completed, it can be considered that an ACK frame without a MAC part has been received, or only a PLCP header of a data frame has been received.

Therefore, the STA proceeds to step 814 if it passes the CRC, and proceeds to step 818 if it fails the CRC.

In step 814, the STA determines if the received frame is an ACK frame or a data frame. If the received frame is a data frame, the STA returns to step 810 to receive an ACK frame responsive to the data frame. Otherwise, if the received frame is an ACK frame, the STA determines in step 816 that there is a hidden station. This is because it can be considered that a normal ACK frame has been received in the state where the STA fails to receive the data frame. That is, it can be considered that this situation corresponds to the range 740 of FIGS. 7A and 7B. Therefore, the STA is detected as a hidden station for a receiving station of the ACK frame. The receiving station can be identified by a MAC address of the information written in a PLCP header of the corresponding frame, because the CRC check was successfully performed.

In step 818, the STA determines whether the situation corresponds to the range 710 or the range 750 of FIGS. 7A and 7B. To this end, in step 818, the STA decodes the PLCP header of the received frame and determines whether it has succeeded in decoding the PLCP header. The STA returns to step 810 if it has failed in decoding the PLCP header of the received frame. However, if the STA has succeeded in decoding the PLCP header of the received frame, it determines in step 820 whether the decoded PLCP header is a desired PLCP header. That is, the STA determines whether the decoded PLCP header is a PLCP header of its desired frame. For example, the PLCP header can be a PLCP header defined in the IEEE 802.11a.

If the decoded PLCP header is a desired PLCP header, the STA proceeds to step 822, and if the decoded PLCP header is not a desired PLCP header, the STA proceeds to step 826. In step 822, the STA checks information written in a length field constituting the PLCP header of the received frame. Thereafter, the STA determines in step 824 whether the length is 14 bytes. The 14-byte length is a length of data in an ACK frame specified in the IEEE 802.11 family. If the checked length is 14 bytes, the STA is detected as a hidden station for a receiving station of the ACK frame, because this situation corresponds to the range 750 of FIGS. 7A and 7B.

However, if the decoded PLCP header is not a desired PLCP header, the STA proceeds to step 826 where it acquires frame length information and data rate information by checking a frame length field and a data rate field constituting the decoded PLCP header. In step 828, the STA calculates a data length in the received frame. The data length can be calculated depending on the acquired frame length information and data rate information.

Thereafter, the STA determines in step 824 whether the length is 14 bytes. The 14-byte length is a length of data in an ACK frame specified in the IEEE 802.11 family. If the calculated length is 14 bytes, the STA is detected as a hidden station for a receiving station of the ACK frame, because this situation corresponds to the range 750 of FIGS. 7A and 7B.

However, if it is determined in step 824 that the length is not 14 bytes, it can be considered that the received frame is a data frame. Therefore, the STA determines that there is no hidden station, because this situation corresponds to the range 710 of FIGS. 7A and 7B. In this manner, the STA transmits data using the RTS/CTS mechanism only in the presence of a hidden station, and transmits data in a normal method in the absence of a hidden station, thereby increasing the system throughput.

Figure 9:
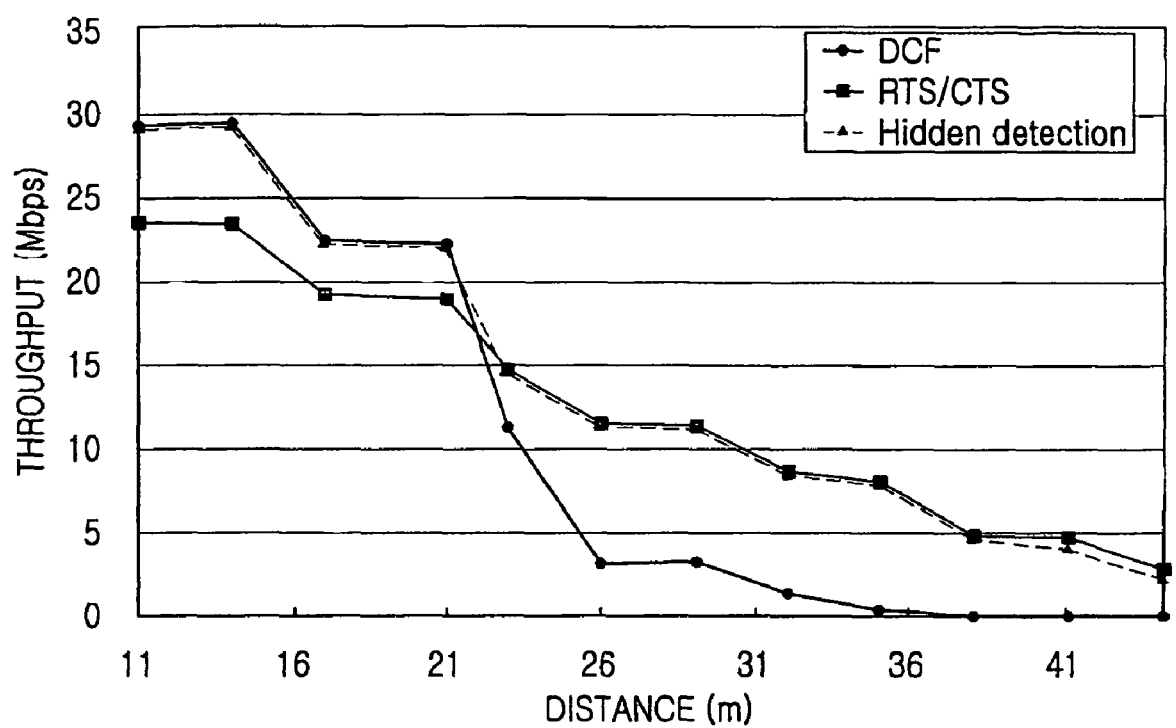
FIG. 9 is a graph illustrating throughput performance of a system employing a hidden station detection method according to the present invention.

FIG. 9 is a graph illustrating throughput performance of a system employing a hidden station detection method according to the present invention. For reference, the simulation conditions are equal to those in FIG. 2. Referring to FIG. 9, when frames are transmitted and received in an existing DCF operation mode (denoted by DCF), as described in FIG. 2, a shorter distance from a base station shows higher system throughput performance, but as a distance from the base station increases, in particular, as the distance increases so that hidden stations occur, the throughput performance decreases abruptly.

Where the RTS/CTS mechanism is used (denoted by RTS/CTS), as described in FIG. 2, the throughput performance is lower than that in the DCF operation mode in the shorter distance where there is no hidden station, but the throughput performance is higher than that in the DCF operation mode in the longer distance where hidden nodes may occur.

Where the RTS/CTS mechanism is used only when hidden stations are detected using the disclosed hidden station detection method (Hidden detection), the Hidden detection shows the throughput performance similar to that in the DCF operation mode in the shorter distance where no hidden station may be discovered, and shows the throughput performance similar to that of the RTS/CTS mechanism in the longer distance where hidden nodes may be detected.

Therefore, use of the disclosed hidden node detection method can obtain the improved throughput performance compared with the separate use of the existing DCF operation mode and the RTS/CTS mechanism.

As can be understood from the foregoing description, the present invention provides a new hidden station detection method that accurately defines, as a hidden station, only the station in the state where use/nonuse of wireless resources cannot be determined in the wireless communication network, thereby improving the system throughput performance not only when the station is located near the base station, but also when the station is located far from the base station.

While the invention has been shown and described with reference to various general aspects thereof, it will be understood by those skilled in the art that various changes in form and details may be made therein without departing from the spirit and scope of the invention as defined by the appended claims.

What is claimed is:

1. A method for detecting a hidden station in a specific station constituting a wireless communication network, the method comprising:
receiving, by the specific station, a frame after a lapse of an idle state interval longer than a predetermined waiting time;
determining, by the specific station, whether the received frame is normal by performing a Cyclic Redundancy Check (CRC) on the received frame;
if the CRC is passed:
determining, by the specific station, whether a size of the received frame is equal to an Acknowledge (ACK) frame size; and
determining, by the specific station, that there is a hidden station if the size of the received frame is equal to the ACK frame size, and
there is no hidden station if the size of the received frame is not equal to the ACK frame size; and
if the CRC is failed:
decoding, by the specific station, a Physical Layer Convergence Procedure (PLCP) header of the received frame;
determining, by the specific station, whether the decoded PLCP header is a desired PLCP header of the received frame;
if the decoded PLCP header is the desired PLCP header, determining, by the specific station, that there is a hidden station if a length of the received frame is 14 bytes; and
if the decoded PLCP header is not the desired PLCP header:
acquiring, by the specific station, information on the length and a data rate of the received frame by checking a frame length field and a data rate field of the decoded PLCP header;
calculating, by the specific station and using the acquired information on the length and the data rate of the received frame, the length of the received frame; and
determining, by the specific station, that there is a hidden station if the length of the received frame is 14 bytes,
wherein the specific station determines a data transmission using a Request-to-Send (RTS)/Clear-to-Send (CTS) mechanism if there is a hidden station, and a data transmission in a Distributed Coordinated Function (DCF) if there is no hidden station.

2. The method of claim 1, further comprising determining whether the received frame is an ACK frame, depending on a Medium Access Control (MAC) part included in the received frame.

3. A system for detecting a hidden station in a wireless communication network, the system comprising:
a transmitting station configured to transmit a data frame;
a receiving station configured to:
receive the transmitted data frame; and
transmit an Acknowledge (ACK) frame responsive to the data frame; and
a specific station configured to:
receive a frame after a lapse of an idle state interval longer than a predetermined waiting time;
determine whether the received frame is normal by performing a Cyclic Redundancy Check (CRC) on the received frame;
if the CRC is passed:
determine whether a size of the received frame is equal to a size of the ACK frame; and
determine that there is a hidden station if the size of the received frame is equal to the size of the ACK frame, and
there is not a hidden station if the size of the received frame is not equal to the size of the ACK frame; and
if the CRC is failed:
decode a Physical Layer Convergence Procedure (PLCP) header of the received frame;
determine whether the decoded PLCP header is a desired PLCP header of the received frame;
if the decoded PLCP header is the desired PLCP header, determine that there is a hidden station if a length of the received frame is 14 bytes; and
if the decoded PLCP header is not the desired PLCP header:
acquire information on the length and a data rate of the received frame by checking a frame length field and a data rate field of the decoded PLCP header;
calculate, using the information on the length and the data rate of the received frame, the length of the received frame; and
determine that there is a hidden station if the length of the received frame is 14 bytes,
wherein the specific station determines a data transmission using a Request-to-Send (RTS)/Clear-to-Send (CTS) mechanism if there is a hidden station, and a data transmission in a Distributed Coordinated Function (DCF) if there is no hidden station.

4. The system of claim 3, wherein the specific station is further configured to determine whether the received frame is the ACK frame, depending on a Medium Access Control (MAC) part included in the received frame.

5. A method for detecting a hidden station in a specific station constituting a wireless communication network, the method comprising:
receiving, by the specific station, a frame after a lapse of an idle state interval longer than a predetermined waiting time;
determining, by the specific station, whether the received frame is normal by performing a Cyclical Redundancy Check (CRC) on the received frame;
if the CRC is passed, determining, by the specific station, that the received frame is a hidden station if the received frame is an Acknowledge (ACK) frame including a Medium Access Control (MAC) header; and
if the CRC is failed:
decoding, by the specific station, a Physical Layer Convergence Procedure (PLCP) header of the received frame;
determining, by the specific station, whether the decoded PLCP header is a desired PLCP header of the received frame;
if the decoded PLCP header is the desired PLCP header, determining, by the specific station, that there is a hidden station if a length of the received frame is 14 bytes; and
if the decoded PLCP header is not the desired PLCP header:
acquiring, by the specific station, information on the length and a data rate of the received frame by checking a frame length field and a data rate field of the decoded PLCP header;
calculating, by the specific station and using the acquired information on the length and the data rate of the received frame, the length of the received frame; and determining, by the specific station, that there is a hidden station if the length of the received frame is 14 bytes, wherein the specific station determines a data transmission using a Request-to-Send (RTS)/Clear-to-Send (CTS) mechanism if there is a hidden station, and a data transmission in a Distributed Coordinated Function (DCF) if there is no hidden station.

6. The method of claim 5, further comprising:

if the CRC is passed and when the received frame does not include the MAC header, determining, by the specific station, that there is a hidden station if the size of the received frame is equal to a size of the ACK frame.

7. The method of claim 6, wherein the size of the received frame is determined depending on information included in a physical header of the received frame.

8. The method of claim 6, wherein the size of the received frame is calculated depending on a transmission time and a data rate of the received frame.

9. The method of claim 5, further comprising determining the hidden station as a station corresponding to a destination of the received frame.

* * * * *